(12) United States Patent  
Kanada

(10) Patent No.: US 11,335,107 B2  
(45) Date of Patent: May 17, 2022

(54) GENERATING FILE NAME USING MACHINE-LEARNED MODEL THAT RELEARNS

(71) Applicant: SEIKO EPSON CORPORATION, Tokyo (JP)

(72) Inventor: Kentaro Kanada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 16/818,066

(22) Filed: Mar. 13, 2020

(65) Prior Publication Data

US 2020/0293810 A1 Sep. 17, 2020

(30) Foreign Application Priority Data

Mar. 14, 2019 (JP) .............................. JP2019-046842

(51) Int. Cl.
  *G06V 30/148* (2022.01)
  *G06N 20/00* (2019.01)
  *G06V 30/40* (2022.01)
  *G06V 30/10* (2022.01)

(52) U.S. Cl.
  CPC ........... *G06V 30/153* (2022.01); *G06N 20/00* (2019.01); *G06V 30/40* (2022.01); *G06V 30/10* (2022.01)

(58) Field of Classification Search
  CPC .............. G06K 9/344; G06K 9/00442; G06K 2209/01; G06K 9/00449; G06K 9/6271; G06K 9/2054; G06N 20/00; G06N 3/0454; G06N 3/08
  See application file for complete search history.

(56) References Cited

U.S. PATENT DOCUMENTS 10,140,553 B1 * 11/2018 Vasisht ................ G06N 3/0481

FOREIGN PATENT DOCUMENTS

| JP | 2008-071050 | | 3/2008 |
| JP | 2009-205325 | | 9/2009 |
| JP | 2016-143354 | | 8/2016 |
| JP | 2017-146745 | | 8/2017 |
| JP | 2017146745 A | * | 8/2017 |
| JP | 2019-004372 | | 1/2019 |

* cited by examiner

*Primary Examiner* — Christopher Wait
(74) *Attorney, Agent, or Firm* — Workman Nydegger

(57) ABSTRACT

An information processing device includes a storage section that stores a machine-learned model subjected to machine learning using teaching data in which at least one of an image included in read data of a document read by a scanner, a character string included in the read data, and a layout of the read data that is included in the read data is associated with a file name of the read data, and a controller that generates the file name of the read data using the machine-learned model and at least one of the image, the character string, and the layout that are included in the read data.

9 Claims, 7 Drawing Sheets

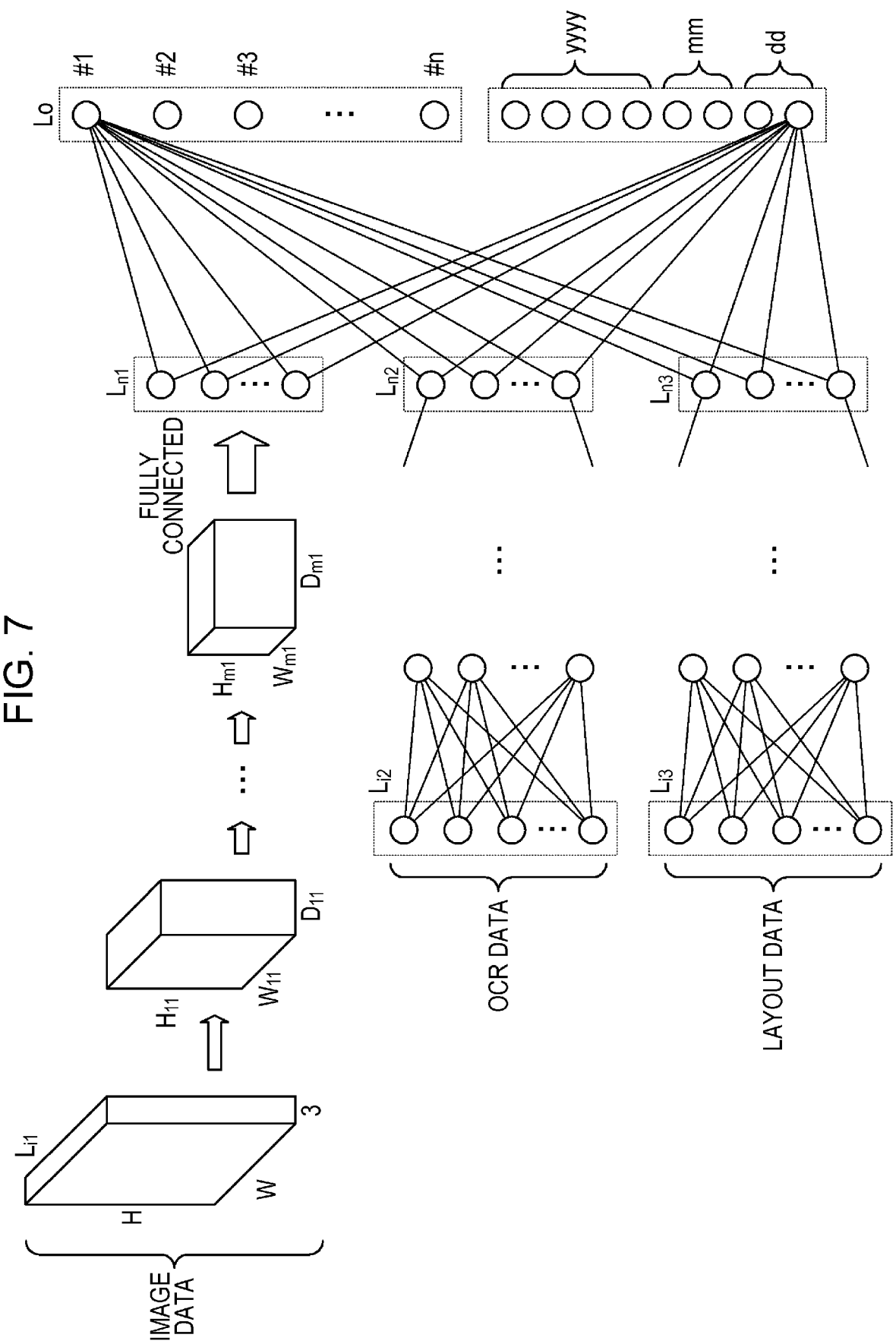

GENERATING FILE NAME USING MACHINE-LEARNED MODEL THAT RELEARNS

The present application is based on, and claims priority from JP Application Serial Number 2019-046842, filed Mar. 14, 2019, the disclosure of which is hereby incorporated by reference herein in its entirety.

BACKGROUND

1. Technical Field

The present disclosure relates to an information processing device, a machine learning device, and an information processing method.

2. Related Art

Traditionally, a technique for automatically generating a file name is known. For example, JP-A-2008-71050 describes a technique for executing a character recognition process by reading image data of a location, which is specified for each form in advance and to be recognized, and for generating a file name based on a character string recognized.

In the traditional technique, a file name is determined based on a character that is in a fixed form and exists in a region specified. Thus, a file name cannot be generated for read data in an unfixed form.

SUMMARY

An object of the disclosure is to generate file names for a wide variety of documents.

To achieve the foregoing object, according to a first aspect of the disclosure, an information processing device includes a storage section that stores a machine-learned model subjected to machine learning using teaching data in which at least one of an image included in read data of a document read by a scanner, a character string included in the read data, and a layout of the read data that is included in the read data is associated with a file name of the read data, and a controller that generates the file name of the read data using the machine-learned model and at least one of the image, the character string, and the layout that are included in the read data. According to this configuration, file names can be generated for a wide variety of documents.

According to the first aspect, the information processing device may further include a learning section that relearns, when the file name generated by the controller is changed, the machine-learned model using the teaching data in which at least one of the image included in the read data, the character string included in the read data, and the layout of the read data that is included in the read data is associated with the file name after the change. According to this configuration, a file name can be output based on a trend in the file name changed.

According to the first aspect, the learning section may relearn the machine-learned model so that an effect of the file name after the change on a learning result is larger than an effect of the file name before the change on the learning result. According to this configuration, a trend in a change by a user can be early learned.

According to the first aspect, the learning section may relearn the machine-learned model so that an effect of the character string changed on the learning result is larger than an effect of the character string before the change on the learning result. According to this configuration, when the user changes the character string, a trend in the character string after the change can be early learned.

According to the first aspect, the fine name may include date information included in the read data. According to this configuration, the file name including the date information can be generated based on the read data.

According to the first aspect, the machine-learned model may output information indicating whether date information is included in the file name. According to this configuration, whether the date information is included in the file name can be learned and the file name can be generated based on the learning result.

According to the first aspect, the file name indicated by the teaching data may include at least one of a character string input by a user and a character string read by executing OCR on the read data. According to this configuration, at least one of a trend in file name generation by the user and a trend in the file name related to the character string included in the read data can be learned.

According to the first aspect, the image may include an image indicating an issuance source of the document, and the controller may identify the issuance source of the document based on the image indicating the issuance source and generate the file name including the name of the issuance source. According to this configuration, a file name based on an image, such as a logomark of a company, can be generated.

To achieve the foregoing object, according to a second aspect of the disclosure, a machine learning device includes a teaching data acquirer that acquires teaching data in which at least one of an image included in read data of a document read by a scanner, a character string included in the read data, and a layout of the read data that is included in the read data is associated with information on a file of the read data, and a learning section that executes, based on the teaching data, machine learning on a machine-learned model to which at least one of the image, the character string, and the layout that are included in the read data is input and that outputs the information on the file of the read data. According to this configuration, the machine-learned model that learns a trend in file name generation based on read data and outputs information indicating the learned trend can be generated.

BRIEF DESCRIPTION OF THE DRAWINGS

FIG. 7 is a diagram depicting a model for executing machine learning.

DESCRIPTION OF EXEMPLARY EMBODIMENTS

Hereinafter, embodiments of the disclosure are described in the following order.
1. Configuration of Information Processing Device as Machine Learning Device
2. Machine Learning Process
3. File Name Generation Process
4. Other Embodiments

Figure 1:
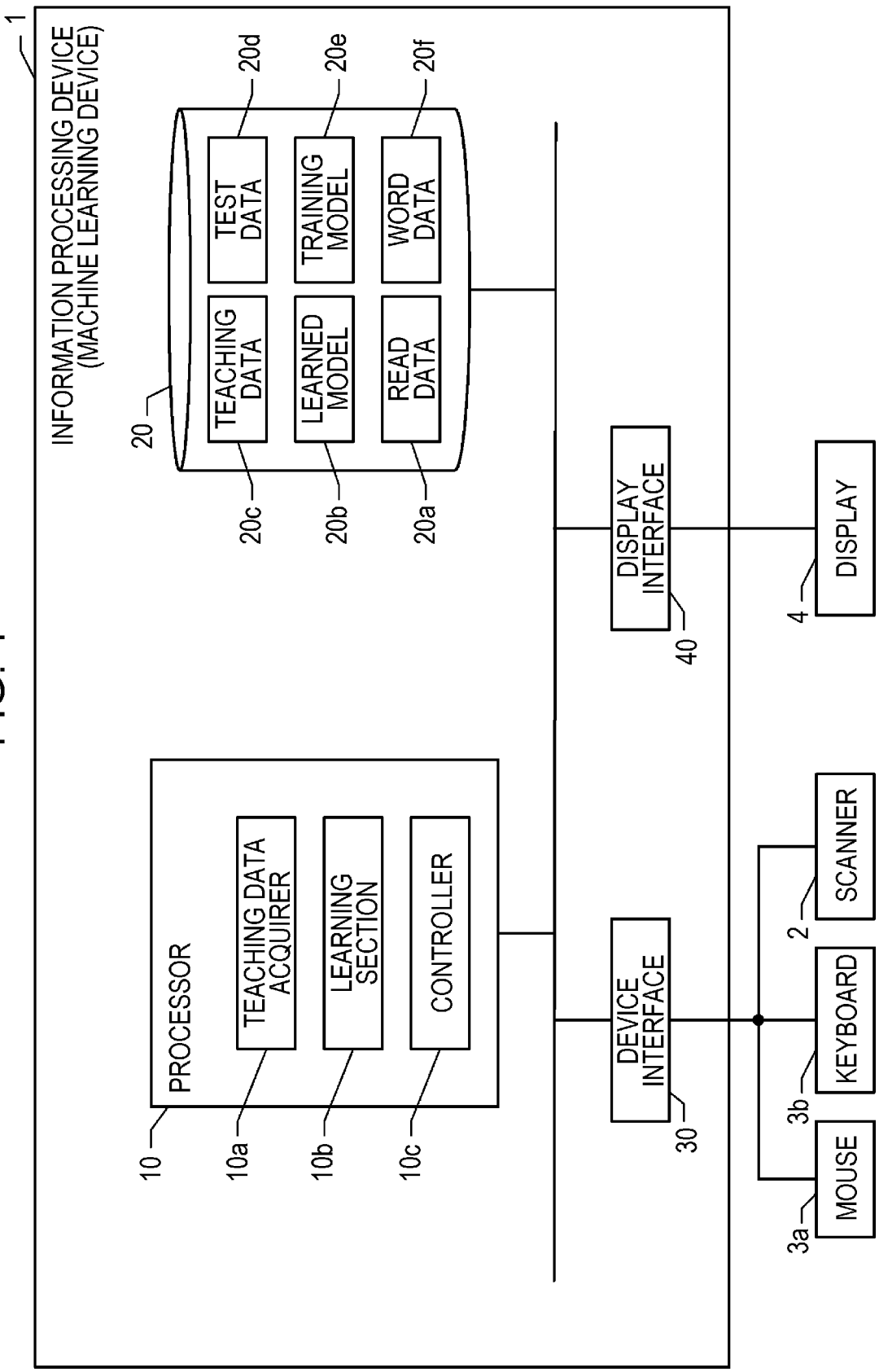
FIG. 1 is a block diagram depicting an information processing device as a machine learning device.

1. Configuration of Information Processing Device as Machine Learning Device FIG. 1 is a block diagram depicting an information processing device 1 according to an embodiment of the disclosure. The information processing device 1 according to the embodiment is a computer coupled to a scanner 2. The information processing device 1 according to the embodiment functions as a machine learning device. The information processing device 1 includes a processor 10, a storage section 20, a device interface 30, and a display interface 40. The storage section 20 is a hard disk drive (HDD) or the like.

The device interface 30 is able to be coupled to a device that executes communication in accordance with a predetermined communication protocol (for example, the Universal Serial Bus (USB) standard). In the embodiment, the scanner 2, a mouse 3a, and a keyboard 3b are coupled to the device interface 30. The scanner 2 includes a light source for emitting light to a document, a color image sensor for receiving the light as read data from the document, a mechanical component for moving various movable components, and the like.

In the embodiment, the scanner 2 reads an arbitrary document and outputs read data indicating details of the document. A file format of the read data is arbitrary. The information processing device 1 acquires the read data output by the scanner 2 via the device interface 30 and stores the read data as read data 20a in the storage section 20. A document reading scheme of the scanner 2 is arbitrary. For example, the document reading scheme of the scanner 2 may be a flat-bed reading scheme or a scheme of reading a document using an automatic document feeder (ADF). Alternatively, the scanner 2 may have the two document reading schemes.

The mouse 3a has a button and an operating unit that is held and moved by a user. The mouse 3a outputs information indicating a movement amount of the operating unit and information indicating a result of an operation performed on the button. The information processing device 1 can acquire the information output by the mouse 3a via the device information 30 and receive an operation performed by the user based on the acquired information. The keyboard 3b has multiple keys and outputs information indicating an operation performed on one or more of the keys. The information processing device 1 can acquire the information output by the keyboard 3b via the device interface 30 and receive an operation performed by the user based on the acquired information.

The display interface 40 is coupled to the display 4. The information processing device 1 outputs a control signal to the display 4 via the display interface 40 and displays various images on the display 4.

The processor 10 includes a CPU, a RAM, and the like and executes various programs stored in the storage section 20. Since the information processing device 1 functions as the machine learning device, the information processing device 1 may include a processor (for example, a GPU, a dedicated processor designed to execute machine learning, or the like) to be used to execute the machine learning.

In the embodiment, the processor 10 can execute a machine learning program for generating a machine-learned model and an information processing program for generating a file name based on the machine-learned model. When either or both of the programs is or are executed, the processor 10 functions as a teaching data acquirer 10a, a learning section 10b, and a controller 10c.

The processor 10 can use functions of the teaching data acquirer 10a and the learning section 10b to execute the machine learning based on teaching data 20c and generate a machine-learned model 20b. The processor 10 can use a function of the controller 10 to generate a file name of the read data based on the machine-learned model 20b.

2. Machine Learning Process

Figure 2:
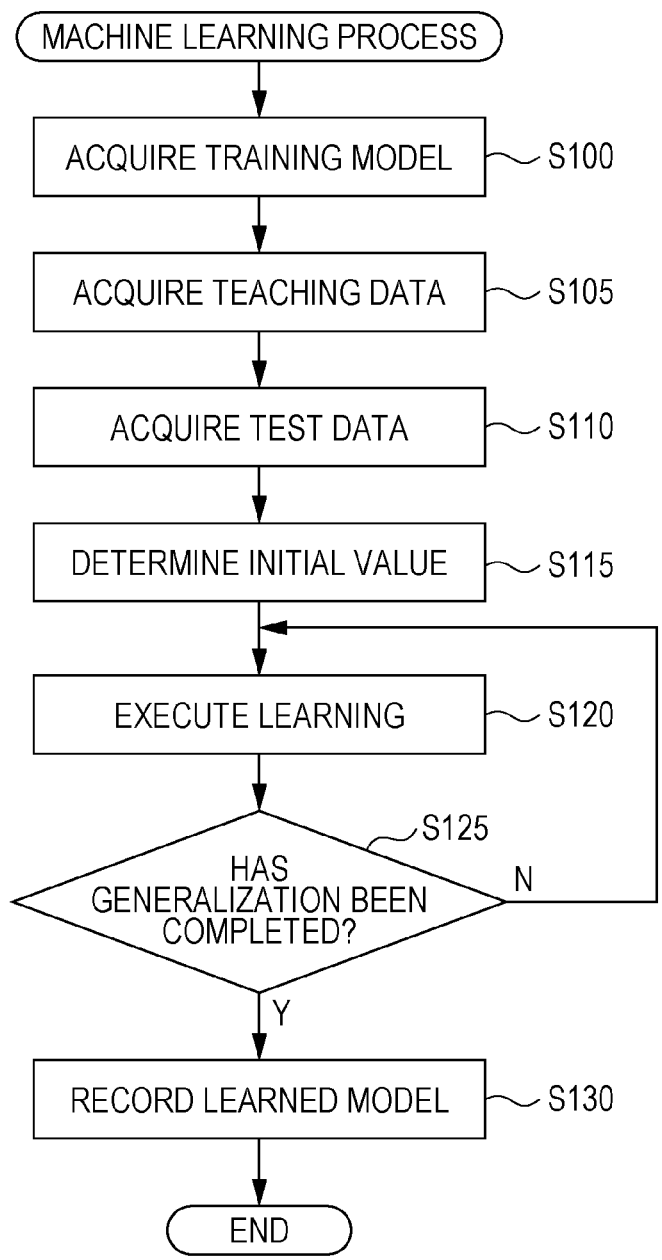
FIG. 2 is a flowchart of a machine learning process.

Next, a machine learning process to be executed by the processor 10 is described. FIG. 2 is a flowchart of the machine learning process. The machine learning process is executed at least once before the file name of the read data is generated. When the machine learning process is already executed once, and the teaching data 20c increases in amount, relearning is executed. The relearning may be executed at various arbitrary times. For example, the relearning may be executed at fixed time intervals or arbitrary time intervals or may be executed at a time specified by the user.

When the machine learning process is started, the processor 10 uses a function of the learning section 10b to acquire a training model (in step S100). The model is information indicating an equation for obtaining an association between data to be estimated and data of a result of the estimation. A model for associating read data with a file name is described below as an example.

Figure 3:
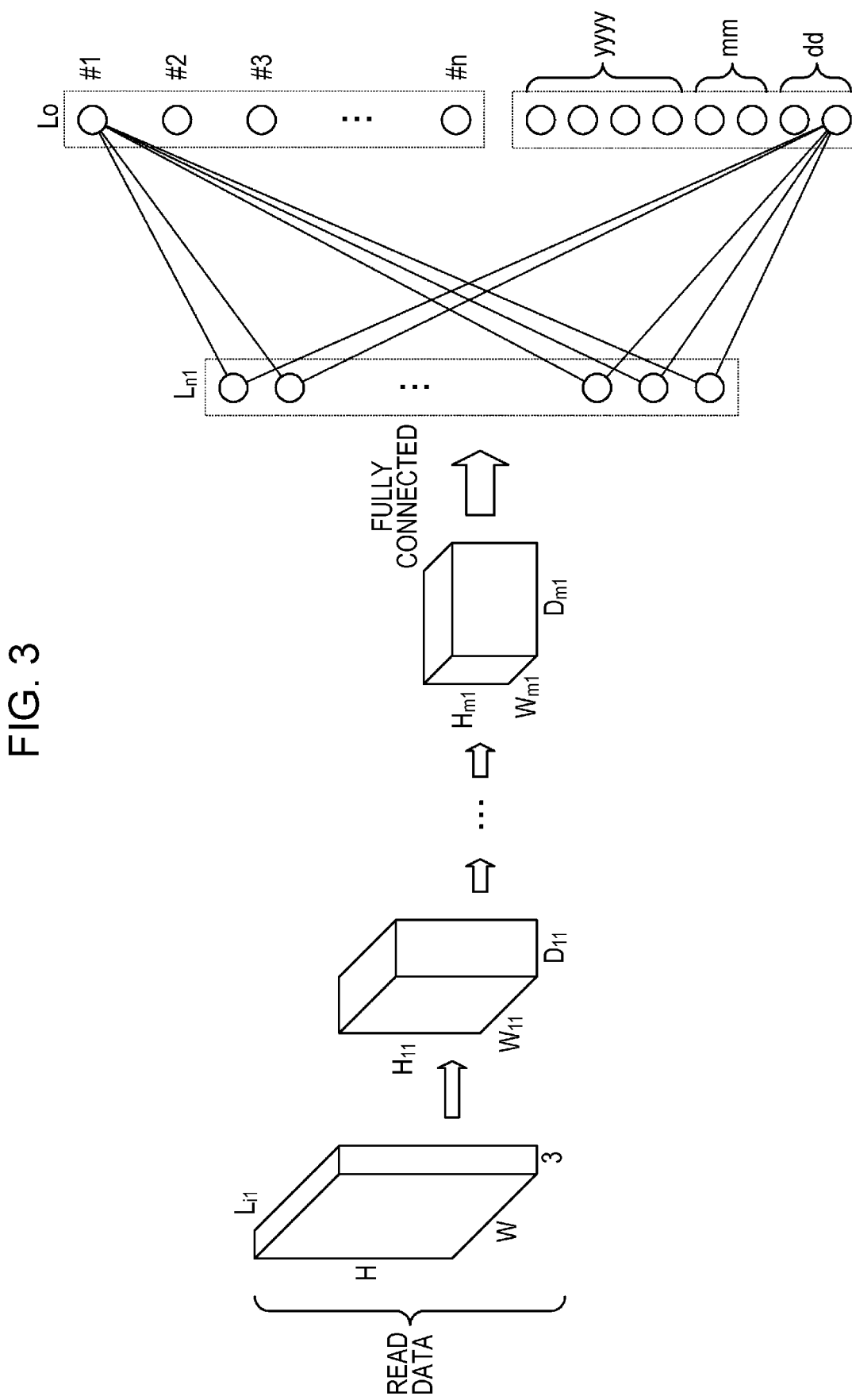
FIG. 3 is a diagram depicting a model for executing machine learning.

As long as input data is converted into output data, the model may be variously defined. In the embodiment, a conventional neural network (CNN) is used. FIG. 3 is a diagram schematically depicting the structure of the neural network that may include the model to be used in the embodiment. In FIG. 3, a change in a data format by the CNN is represented by a change in a cuboid, and nodes of the neural network are represented by white circles.

The model according to the embodiment treats data read by the scanner 2 as data to be input to an input layer $L_{i1}$ of the CNN and outputs intermediate output data on the read data from a layer $L_{n1}$. The read data input to the CNN has a number N of pixels in a vertical direction and a number W of pixels in a horizontal direction. Gradation values of 3 channels or red (R), green (G), and blue (B) channels are defined for each of the pixels. FIG. 3 schematically depicts an image of the input layer $L_{i1}$ using a cuboid with a number H of pixels in the vertical direction, a number W of pixels in the horizontal direction, and 3 pixels in a depth direction. FIG. 3 indicates an example in which, after the image is input to the input layer $L_{i1}$, the image passes through the CNN or is subjected to convolution by a predetermined number of filters having a predetermined size, calculation using an activation function, and calculation in a pooling layer and is converted into a number $H_{11} \times W_{11} \times D_{11}$ of output values. FIG. 3 depicts the example in which, after the conversion, the output values are converted into a number $H_{m1} \times W_{m1} \times D_{m1}$ of output values via multiple layers (not depicted). After the number $H_{m1} \times W_{m1} \times D_{m1}$ of output values are obtained by the CNN, output values indicating intermediate output data on the read data are obtained in the layer $L_{n1}$ via full connection.

Nodes of the layer $L_{n1}$ are connected to an output layer $L_o$ via the neural network, and information indicating a file name is output from the output layer $L_o$. Multiple layers may exist between the layer $L_{n1}$ and the output layer $L_o$. It is sufficient if the output from the output layer $L_o$ indicates the file name. The output from the output layer $L_o$ may be in any of various forms. In the example depicted in FIG. 3, a number n (n is an integer of 2 or greater) of nodes (nodes #1 to #n depicted in FIG. 3) indicating words to be arranged at positions within the file name and nodes (yyyy, mm, and dd depicted in FIG. 3) indicating date information exist in the output layer $L_o$.

Figure 4:
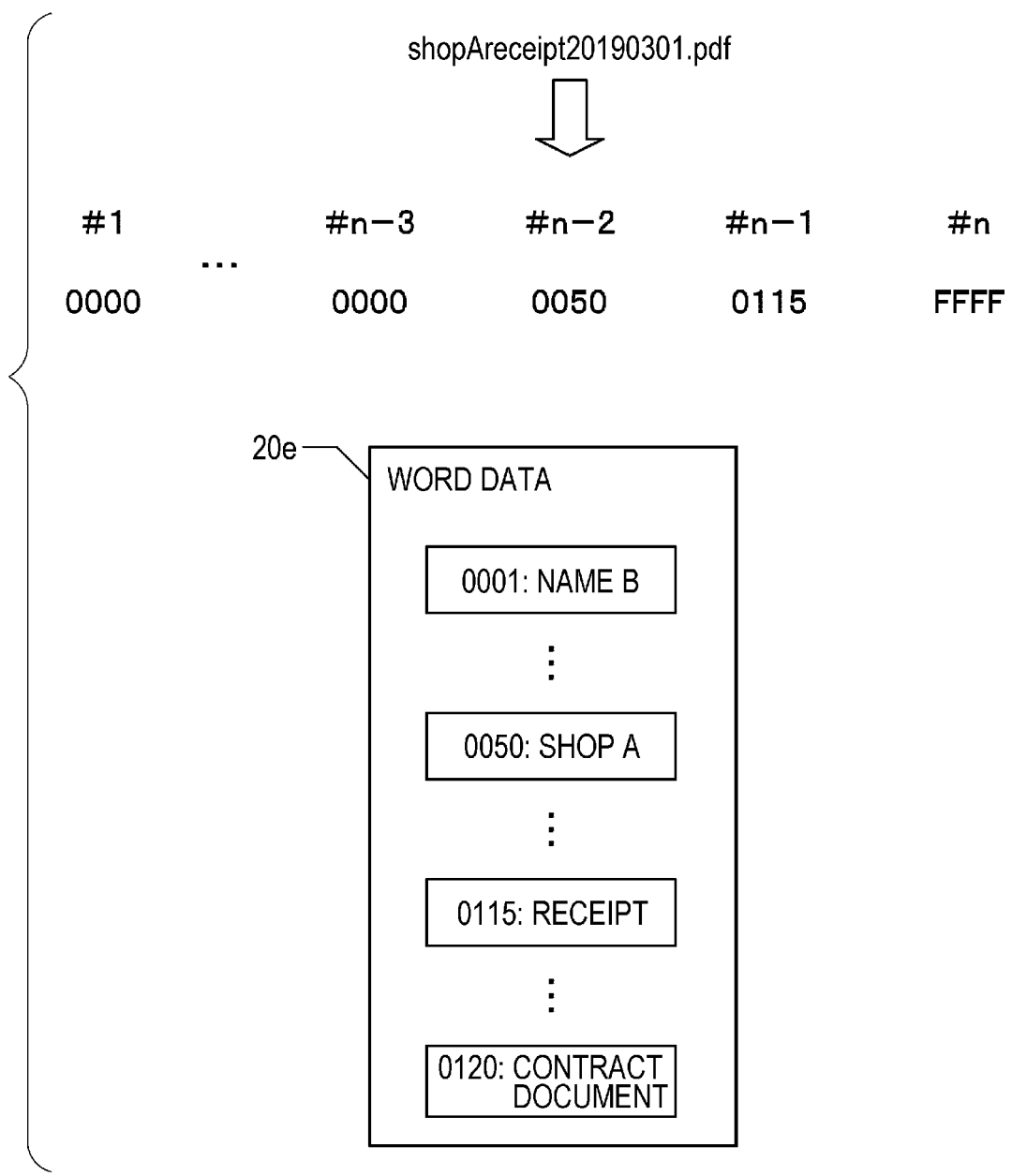
FIG. 4 is a diagram depicting the identification of a file name.

Specifically, a 4-digit year (yyyy), a 2-digit month (mm), and a 2-digit date (dd) are associated with the nodes indicating the date information. When the date information is included in the read data, the nodes indicating the date information output the date information based on values of the date information or the like. The nodes indicating the words to be arranged at the positions output codes of the words to be arranged at the positions. FIG. 4 is a diagram depicting a state in which the file name is identified by identifying the words to be arranged at the positions. In the embodiment, the node #1 indicates a word to be arranged on the leftmost side, and the node #2 indicates a word to be adjacent on the right side to the word to be arranged on the leftmost side. Regarding each of the nodes #3 and later, as the number of the node increases by 1, the position of a word indicated by the node is shifted by one word. The node #n indicates a word to be arranged on the rightmost side. Since this example assumes a country in which characters are arranged in order from the left side to the right side, the word at the position indicated by the node #n exists immediately before an extension.

In the embodiment, a word string that exists before the extension (or exists on the left side of the extension) is the file name generated by the machine-learned model 20b. A file name exemplified in FIG. 4 is "shopAreceipt20190301". The file name is composed of 3 words, "shop A", "receipt", and "20190301". The character string is decomposed to the words by one or more of known various methods, such as morphological analysis.

In the embodiment, any of a value indicating blank, a word code, and a value indicating date information is output from a node indicating a word to be arranged at each position. For example, as depicted in FIG. 4, when the 3 words form the file name, code values that are significant values are output from the nodes #n-2, #n-1, and #n, and 0000 that is a value indicating that a word does not exist is output from each of the other nodes. When a word to be arranged at an arbitrary position is date information, a node indicating the word outputs FFFF. Specifically, when the output of the node is FFFF, a file name including date information at a position indicated by the node is generated. In the embodiment, in the foregoing configuration, the file name that includes the date information can be generated based on the read data.

In the embodiment, word codes are generated in advance and identified based on word data 20f stored in the storage section 20. FIG. 4 depicts an example in which a code 0001 is associated with a word "name B", a code 0050 is associated with the word "shop A", a code 0115 is associated with the word "receipt", and a code 0120 is associated with a word "contract document". In this example, the code 0050 indicating the word "shop A" existing on the leftmost side of the file name is the output of the node #n-2, the code 0115 indicating the next word "receipt" is the output of the node #n-1, and the code FFFF indicating the date information existing on the rightmost side of the file name is the output of the node #n.

The word data 20f may be generated by one or more of various methods. Codes are added to words forming the file name associated with the read data in the teaching data 20c and are included in the word data 20f. The number of words included in the word data 20f may be larger than the number of words forming the file name associated with the read data in the teaching data 20c. For example, words and the like that are collected from various corpuses and internet-accessible websites may form the word data 20f. Codes associated with words may be expressed by one or more of various methods. For example, the codes associated with the words may be generated using a technique, such as word2vec. In this case, a difference calculated using a loss function described later may be a difference between words expressed by vectors. In any case, the word data 20f may define that, as a difference between codes or between values (vectors) associated with the codes is smaller, meanings of words associated with the codes are closer to each other or the words are more likely to form a file name.

The model according to the embodiment includes a number n of nodes indicating words to be arranged at positions in a file name and nodes indicating date information. According to this configuration, the file name can be generated by determining the words to be arranged at the positions from the word data 20f or the date information based on output values (or values closest to the output values) of the number n of nodes indicating the words to be arranged at the positions in the file name.

A portion of the model depicted in FIG. 3 may be expressed using a known function, the other portion of the model may be expressed using an unknown function, and the unknown function may be a target to be learned. Even in the case where the model is in any form, when the model is built to finally output a file name after the input of the read data to the model, the model for estimating the file name from the read data can be learned.

In step S100 of the flowchart depicted in FIG. 2, a training model is acquired. Training indicates a target to be learned. Specifically, the training model outputs a file name based on the read data, but an association between the read data and the file name may not be correct in an initial state. In other words, although the number of layers formed by nodes and the number of nodes in the training model are determined, parameters (weights, biases, and the like) defining relationships between the input and output of the model are not optimized. The parameters are optimized during the machine learning (or are trained).

The training model may be determined in advance. Alternatively, the user may operate the mouse 3a and the keyboard 3b to input the training model so that the processor 10 acquires the training model. In both cases, as indicated in the example depicted in FIG. 3, the processor 10 acquires, as the training model, the parameters of the CNN or neural network for outputting a file name based on the read data. The training model is stored as a training model 20e in the storage section 20. In the case where the relearning is executed, the training model may be a known model.

Next, the processor 10 uses a function of the learning section 10b to acquire the teaching data (in step S105). In the embodiment, the teaching data 20c is data in which the read data of the scanned document is associated with the file name added to the read data when the read data is stored. In the embodiment, when the document is scanned and the file name is added to the read data based on a character string input by the user, the read data is associated with the file name and stored. In addition, the teaching data 20c defining the association between the read data and the file name is added to the storage section 20. The processor 10 acquires the latest teaching data 20c in step S105.

Next, the processor 10 uses a function of the learning section 10b to acquire test data (in step S110). The test data is used to confirm whether a learning result has been generalized. The test data is not used for the learning. The test data may be prepared separately from the teaching data 20c. In the embodiment, however, a portion of the teaching data 20c acquired in step S105 is secured as the test data.

Next, the processor 10 uses a function of the learning section 10b to determine an initial value (in step S115). Specifically, the processor 10 gives the initial value to a variable parameter of the training model acquired in step S100. The initial value may be determined by one or more of various methods. For example, the initial value may be a random value, 0, or the like. Alternatively, an initial value for the weights and an initial value for the biases may be determined based on ideas different for the weights and the biases. The initial value may be adjusted so that the parameters are optimized during the learning. In the case where the relearning is executed, the initial value may be a value of the existing machine-learned model 20b.

Next, the processor 10 uses a function of the learning section 10b to execute the learning (in step S120). Specifically, the processor 10 inputs the teaching data 20c acquired in step S105 to the training model acquired in step S100 and calculates output indicating a file name. In addition, the processor 10 uses a loss function indicating a difference between the output file name and the file name indicated by the teaching data 20c to identify the difference. Then, the processor 10 repeatedly executes a process of updating the parameters a predefined number of times based on the derivative of the loss function with respect to the parameters. The loss function may be any of various functions. For example, the loss function may be a cross-entropy error function or the like.

A process of calculating the loss function is executed on all or a portion of the read data indicated by the teaching data 20c, and the loss function for learning to be executed once is expressed by the average or sum of results of the process. After the loss function for the learning to be executed once is obtained, the processor 10 updates the parameters based on a predefined optimization algorithm, for example, the stochastic gradient descent or the like.

After the parameters are updated the predefined number of times in the foregoing manner, the processor 10 determines whether the generalization of the training model has been completed (in step S125). Specifically, the processor 10 inputs the test data 20d acquired in step S110 to the training mode and obtains the output indicating the file name. Then, the processor 10 obtains the number of output file names matching a file name associated with the test data and obtains estimation accuracy by dividing the number of output file names by the number of samples indicated by the test data 20d. In the embodiment, the processor 10 determines that the generalization has been completed when the estimation accuracy is equal to or greater than a threshold.

The validity of a hyperparameter may be verified as well as the evaluation of generalization performance. The hyperparameter is a variable amount other than the weights and the biases. For example, in a configuration in which the number of nodes or the like is tuned, the processor 10 may verify the validity of the hyperparameter based on verification data. The verification data may be prepared in the same manner as step S110 or may be extracted from a portion of the teaching data 20c. The verification data is not used for training.

When the processor 10 determines that the generalization of the training model has not been completed in step S125, the processor 10 repeatedly executes step S120. In other words, the processor 10 further updates the weights and the biases. On the other hand, when the processor 10 determines that the generalization of the training model has been completed in step S125, the processor 10 records the machine-learned model (in step S130). Specifically, the processor 10 records the training model as the machine-learned model 20b in the storage section 20.

According to the foregoing configuration, a file name can be generated by inputting arbitrary read data to the machine-learned model 20b. Thus, a file name generation rule for generating a file name based on a character, which is in a fixed form and exists at a specified location, may not be artificially determined, and a file name suitable for a trend in the file name indicated by the teaching data 20c can be output based on an image of a document of any type. Thus, a wide variety of documents may be targets for which file names are to be generated. Furthermore, a file name suitable for user's preference can be generated by preparing the teaching data 20c in advance to generate the file name preferred by the user.

3. File Name Generation Process

Figure 5:
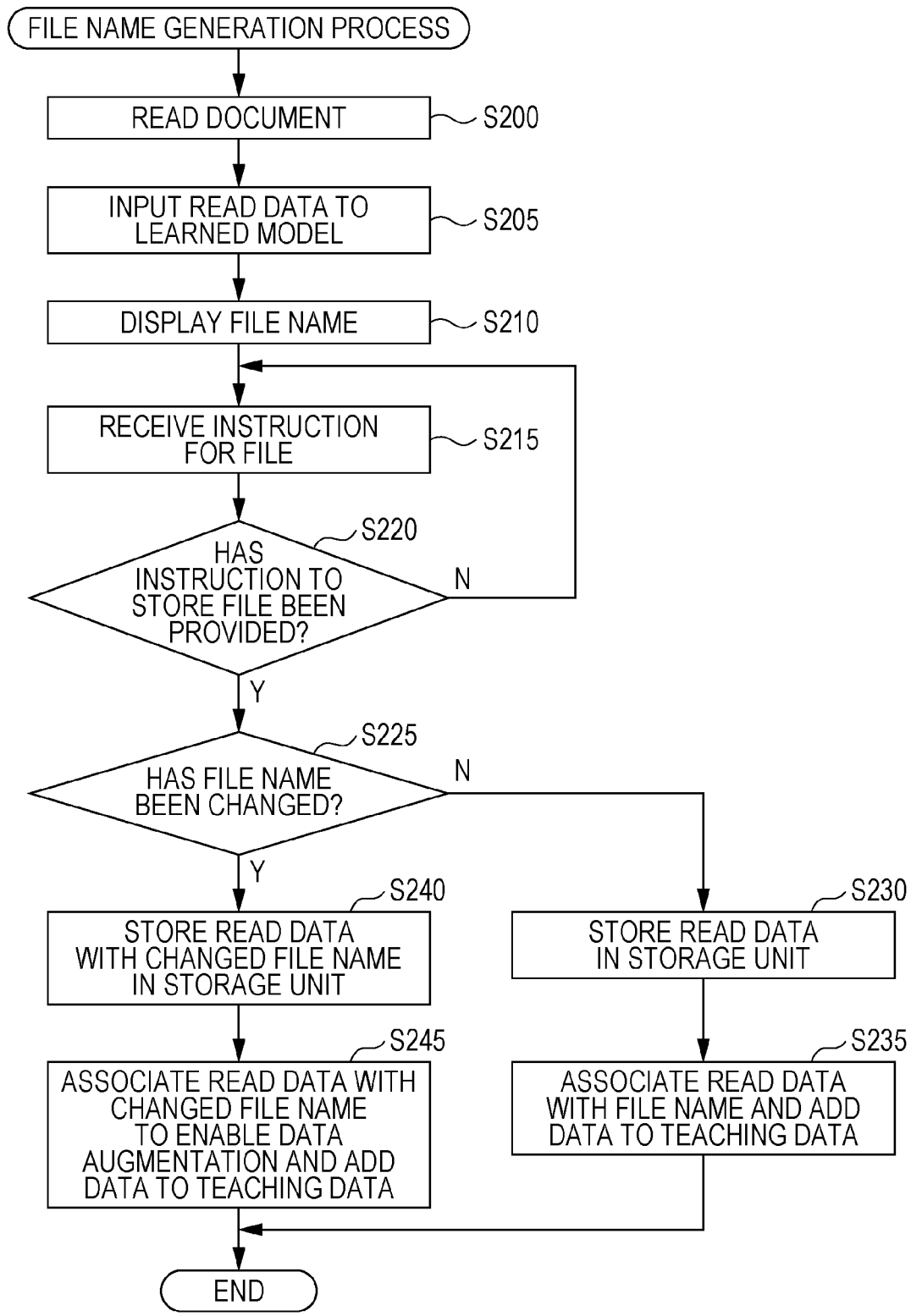
FIG. 5 is a flowchart of a file name generation process.

Next, a file name generation process to be executed by the processor 10 is described. FIG. 5 is a flowchart of the file name generation process. The file name generation process is executed after the generation of the machine-learned model 20b. The file name generation process may be executed every time scanning is executed by the scanner 2. Alternatively, the file name generation process may be executed in accordance with an instruction from the user or may be executed at any time.

When the file name generation process is started, the processor 10 uses a function of the controller 10c to read a document (in step S200). Specifically, the processor 10 outputs a control signal to the scanner 2 via the device interface 30 and causes the scanner 2 to scan the document set on the scanner 2 by the user. The scanner 2 outputs read data obtained as a result of reading the document and the processor 10 acquires the read data via the device interface 30.

Figure 6:
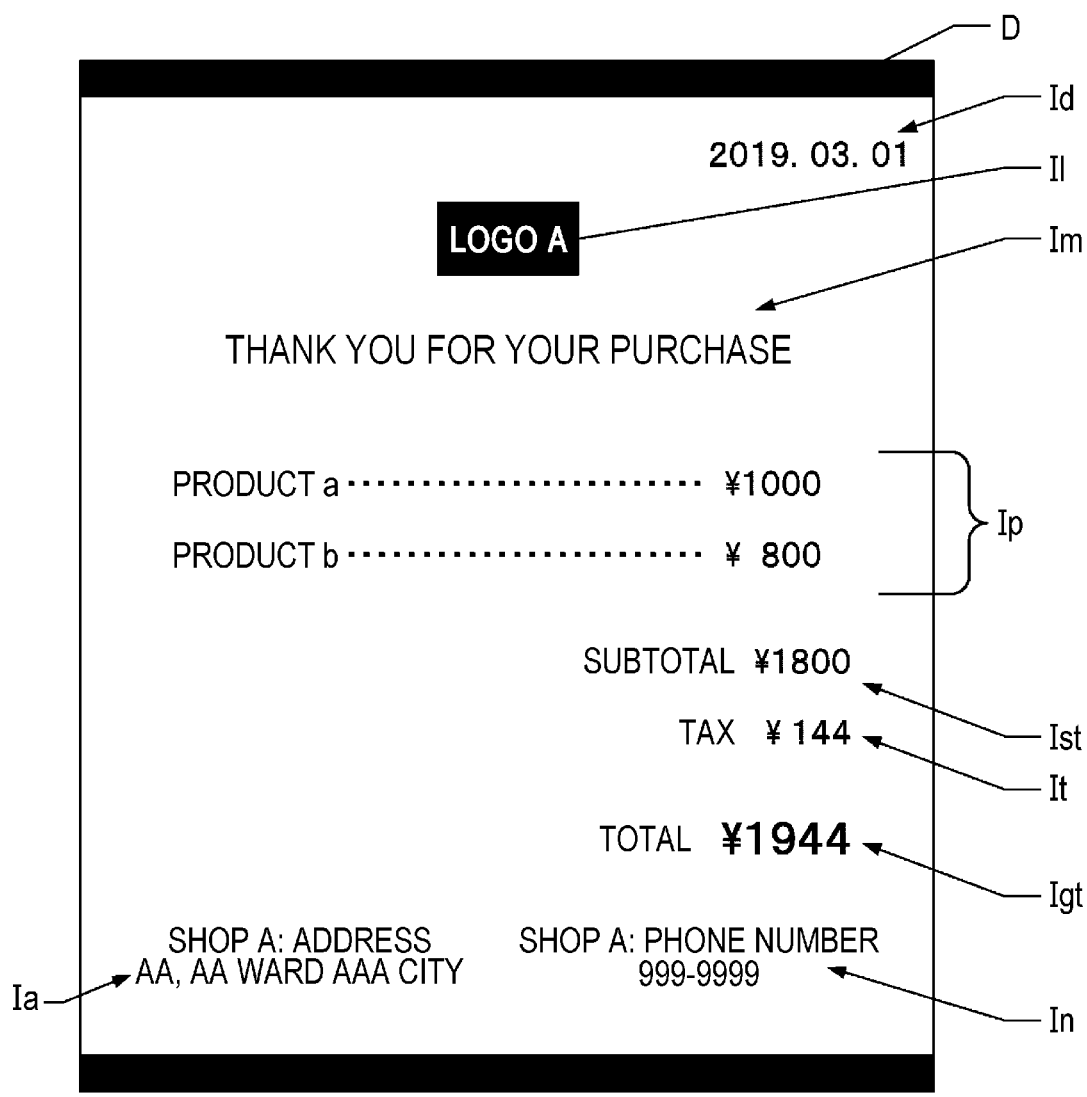
FIG. 6 is a diagram depicting an example of a document.

FIG. 6 is a diagram depicting an example of the document. A document D depicted in FIG. 6 is a receipt. In this example, date information Id is indicated on the upper right side of the document D and a logo Il indicating the shop A is indicated in the upper center of the document D. A message Im indicating "thank you for your purchase" is indicated on the lower side of the logo Il. The sizes of the characters of the message Im are larger than the date information Id. Prices Ip of purchased products a and b are indicated on the lower side of the message Im, and a subtotal Ist is indicated on the lower side of the prices Ip. A tax It is indicated on the lower side of the subtotal Ist, and the total Igt of the subtotal Ist and the tax It is indicated on the lower side of the tax It. In addition, an address Ia of the shop A is indicated on the left lowermost side of the document D, and a phone number In of the shop A is indicated on the right lowermost side of the document D. The document D is not limited to the receipt and may be another document, such as a contract document, for example.

In step S200, when the document is read, the processor 10 acquires the read data serving as image data and indicating the document including such details as depicted in FIG. 6. Next, the processor 10 uses a function of the controller 10c to input the read data to the machine-learned model (in step S205). Specifically, the processor 10 executes a preprocess (for example, an enlargement process or a reduction process, standardization, and the like) on the read data so that the read data is in a format enabling the read data to be input to the machine-learned model 20b.

In addition, the processor 10 acquires the machine-learned model 20b from the storage section 20, inputs the read data subjected to the preprocess to the machine-learned model 20b, and acquires an output result obtained by the machine-learned model 20b. As a result, output values of the nodes #1 to #n and output values of the nodes indicating the date information are obtained. The processor 10 identifies words to be arranged at the positions indicated by the nodes #1 to #n, based on the output values of the nodes #1 to #n.

Specifically, when a node whose output value is 0000 exists among the nodes #1 to #n, the processor 10 determines that a word does not exist at a position indicated by the node. When a node whose output value is FFFF exists among the nodes #1 to #n, the processor 10 inserts date information into a position indicated by the node. The date information is the output values of the nodes indicating the date information. When nodes whose output values are not FFFF exist among the nodes #1 to #n, the processor 20f references the word data 20f, identifies words indicated by the output values, and inserts the identified words into positions indicated by the nodes.

For example, when the user has added a file name "shopAreceipt20190301" to the read data of the document D depicted in FIG. 6 in the past, the machine-learned model 20b reproduces a learning result in which a characteristic of the document D is associated with a characteristic of the file name. For example, the following trend is learned by the machine-learned model 20b. The trend is that when the date information Id exists on the upper right side of the document D, the date information is added to the file name so that the date information exists immediately after the file name, when the logo Il exists in the upper center of the document D, the "shop A" is added to the file name so that "shop A" exists at the beginning of the file name, and when the prices Ip, the subtotal Ist, the tax It, and the total Igt are arranged in this order from the upper side to the lower side in the center of the document D, "receipt" is added to the file name so that "receipt" exists between "shop A" and the date information Id in the file name.

When the document D depicted in FIG. 6 is read in step S200, it is likely that the output values of the nodes #1 to #n−3 are 0000, the output value of the node #n−2 is 0050, the output value of the node #n−1 is 0115, and the output value of the node #n is FFFF as output of the machine-learned model 20b. In addition, it is likely that the output values of the nodes indicating the date information are 20190301 as output of the machine-learned model 20b. In this case, the processor 10 arranges the word "receipt" with the code 0115 immediately after the word "shop A" with the code 0050 and generates, as the file name, a character string having the date information "20190301" immediately after "receipt".

After generating the file name, the processor 10 displays the file name (in step S210). Specifically, the processor 10 controls the display 4 to display the file name on the display 4. The file name may be displayed in any of various aspects. For example, the processor 10 may display candidate storage locations and candidate file names on the display 4.

Next, the processor 10 uses a function of the controller 10c to receive an instruction for a file (in step S215). Specifically, the processor 10 controls the display 4 to display a user interface to receive the instruction for the file or an instruction to store the file, an instruction to change the file name, or the like. The user can operate an input unit, such as the mouse 3a, the keyboard 3b, or the like, to provide the instruction to store the file, the instruction to change the file name, or the like while visually recognizing the user interface.

Next, the processor 10 uses a function of the controller 10c to determine whether the instruction to store the file has been provided (in step S220). The processor 10 repeatedly executes the processes of steps S215 and S220 until the processor 10 determines that the instruction to store the file has been provided in step S220. When the processor 10 determines that the instruction to store the file has been provided in step S220, the processor 10 uses a function of the controller 10c to determine whether the file name has been changed (in step S225). Specifically, when the instruction to store the file is provided in the process of step S215 after the change in the file name, the processor 10 determines that the file name has been changed in step S225.

When the processor 10 determines that the file name has not been changed in step S225 or when an instruction to store the read data is provided without a change in the file name generated by the machine-learned model 20b, the processor 10 causes the read data (read data 20a depicted in FIG. 1) of the file name to be stored in the storage section 20 (in step S230). Next, the processor 10 uses a function of the controller 10c to associate the read data with the file name and add the read data and the file name to the teaching data 20c (in step S235). Specifically, in the embodiment, when the file name is added to and stored in the read data, data in which the read data and the file name are associated with each other is added to the teaching data 20c.

When the processor 10 determines that the file name has been changed in step S225, the processor 10 uses a function of the controller 10c to cause the read data (read data 20a depicted in FIG. 1) with the changed file name to be stored in the storage section 20 (in step S240). Next, the processor 10 uses a function of the controller 10c to associate the read data with the changed file name to enable data augmentation and add the read data and the changed file name to the teaching data 20c (in step S245). Specifically, in the embodiment, when the changed file name is added to and stored in the read data, data in which the changed file name and the read data are associated with each other is copied to increase the data to 2 or more samples, and the data after the increase is added to the teaching data 20c.

When the read data and the file name are added to the teaching data 20c in the foregoing step S235 or S245, the addition is reflected in the relearning. Specifically, the processor 10 can relearn the machine-learned model 20b at various times. The relearning is executed using the teaching data 20c including the data added in step S235 or the data added in step S245. Thus, in the embodiment, when the file name generated by the controller is changed, the processor 10 relearns the machine-learned model 20b using the teaching data in which an image included in the read data is associated with the file name after the change.

When the user changes the file name in step S215, the user selects and determines a file name different from the file name generated by the machine-learned model 20b. In this case, the user may add the file name to a document of the same type in the same trend, and the file name that may be added in the trend is unlikely to be generated by the machine-learned model 20b. To early relearn the trend, the processor 10 executes the data augmentation in the addition of the data to the teaching data 20c in step S245.

The data augmentation may be a process that causes an effect of the file name after the change on a learning result to be larger than an effect of the file name before the change on the learning result. In the embodiment, the processor 10 generates 2 or more data items in which the file name after the change is associated with the read data, and the processor 10 adds the generated data items to the teaching data 20c. As a result, the teaching data 20c with the data items has a larger effect on the learning result than an effect of the teaching data 20c with the data added thereto in step S235 on the learning result. A data amount to be increased due to the data augmentation may be identified by one or more of various methods. For example, the processor 10 may have a configuration in which, as the number of samples of the teaching data 20c is larger, the data amount to be increased due to the data augmentation is larger. In this configuration, when the relearning is executed, the file name changed by the user or a file name having the same trend as the file name changed by the user has a larger effect on the learning than an effect of the file name determined without a change on the learning result, and the trend in the file name after the change is early learned.

In step S245, the read data and the changed file name are associated with each other to enable the data augmentation. In the embodiment, however, the machine-learned model 20b defines a file name in units of words. Thus, the file name added to the teaching data 20c is also defined in units of words. Thus, when a word of the file name is changed, the relearning is executed so that an effect of the changed word (character string) on the learning result is larger than an effect of the character string before the change on the learning result.

For example, when a file name "shopAreceipt20190301" is changed to a file name "receiptshopA20190301", the initial two words of the original file name are different from the initial two words of the file name after the change, but the date information of the original file name that is the last portion of the original file name is not changed. Thus, when data in which the file name after the change and the read data are associated with each other is generated to enable the data augmentation, the learning is promoted so that the initial two words are output as words different from the original file name and that the date information that is the last portion of the original file name is maintained.

As a result, the relearning is executed so that an effect of the changed words (character string) on the learning result is larger than an effect of the character string before the change on the learning result and that an effect of the unchanged word on the original learning result is maintained. Thus, the relearning can be executed so that the file name in which the changed words (character string) are reflected is generated.

4. Other Embodiments

The foregoing embodiment is an example of the disclosure, and other various embodiments may be included in the disclosure. For example, the machine learning device according to the embodiment of the disclosure or the information processing device may be applied to an electronic device to be used for a purpose other than reading. The electronic device is, for example, a multifunction device or the like. The technique for generating a file name based on read data in the embodiment may be enabled as a program, a method, or the like.

The number of devices forming the information processing device may be arbitrary. For example, the information processing device 1 and the scanner 2 may be unified into a single device. For example, the information processing device 1 and one or more of other various devices, such as the display 4, may be unified into a single device. In addition, the scanner 2 may be controlled by a tablet terminal formed by unifying the information processing device 1 and the display 4.

The functions of the information processing device 1 may be enabled by multiple devices. For example, a server and a client may be configured so that the server and the client are able to be coupled to each other, one of the server and the client may execute the machine learning process, and the other of the server and the client may execute the file name generation process. When the machine learning process and the fine name generation process are to be executed by devices that exist at positions away from each other, the machine-learned model may be shared by the devices or may exist in one of the devices.

When the machine-learned model exists in a device that executes the machine learning process and the machine-learned model does not exist in a device that executes the file name generation process, the device that executes the file name generation process provides an inquiry about a file name to the device that executes the machine learning process. The machine learning device may be distributed and exist in multiple devices, or the information processing device may be distributed and exist in the multiple devices. In addition, the foregoing embodiment is an example, a configuration among the configurations described in the embodiment may be omitted in the embodiment, and another configuration may be added to the embodiment. The machine-learned model may be generated for a user of a specific scanner 2 or may be generated and used by multiple users based on file names and read data collected from the multiple users who use multiple scanners 2.

It is sufficient if the storage section stores the machine-learned model subjected to the machine learning using teaching data in which at least one of an image included in read data of a document read by the scanner, a characteristic string included in the read data, and a layout of the read data that is included in the read data is associated with a file name of the read data. Specifically, it is sufficient if the storage section stores the machine-learned model to which a document characteristic indicated by the read data is input and that outputs a file name.

It is sufficient if the document is to be read by the scanner. The shape, size, and details of the document are not limited. Thus, the document is not limited to such a receipt as described above in the embodiment. For example, the document may be a contract document, any of various business documents, a private document, an address book, a document indicating details of various databases, or a document indicating an image, such as a picture, or the like. The document may be any of various documents able to be scanned.

It is sufficient if the read data indicates a result of reading the document. Although the read data indicates the image of the document, both the image and information extracted from the read data may be the teaching data. Specifically, various information may be extracted from the image indicated by the read data and may be the teaching data. For example, optical character recognition (OCR) may be executed based on the read data to extract a character string from the read data. The character string and the image that are included in the document may be identified based on image processing executed on the read data or the like, and a layout that indicates the sizes, positions, and the like of the character string and the image may be extracted from the read data.

It is sufficient if the teaching data is data in which the read data and the file name of the read data are associated with each other. the file name may be associated with the read data when the read data is stored as a file.

It is sufficient if the machine-learned model reproduces a relationship between read data indicated by teaching data and a file name and outputs a file name associated with arbitrary read data. Thus, the structure of the machine-learned model is arbitrary as long as the machine-learned model outputs the file name based on the read data. Specifically, the machine learning and the model are arbitrary as long as the model is learned so that the model reproduces the foregoing relationship between the input and the output.

For example, in the case where the machine learning is executed by the neural network, it is sufficient if the following various elements are selected and the machine learning is executed. The various elements are the number of layers forming the model, the number of nodes forming the model, the type of the activation function, the type of the loss function, the type of gradient descent, the type of the optimization algorithm, which is the gradient descent or the like, whether or not minibatch learning is executed, the number of batches, a learning rate, the initial values, whether or not an overlearning suppression method is executed, the type of the overlearning suppression method, whether or not a convolution layer exists, the sizes and types of the filters for the convolution, types of padding and stride, whether or not the pooling layer exists, the type of the pooling layer, whether or not a fully connected layer exists, whether or not a recursive structure exists, and the like. The learning may be executed by other machine learning, for example, a support-vector machine, clustering, reinforcement learning, or the like.

In addition, the machine learning may be executed so that the structure (for example, the number of layers, the number of nodes in each of the layers, and the like) of the model is automatically optimized. Furthermore, the learning may be executed in multiple stages. For example, a configuration in which machine learning is executed to output details (the type of a logomark and the like) of the image based on the read data and machine learning is executed to output a file name based on the details of the image may be applied. In addition, a server may be configured to collect the teaching data from multiple clients and execute the machine learning based on the teaching data.

It is sufficient if the controller generates the file name of the read data using the machine-learned model and at least one of the image included in the read data, the character string included in the read data, and the layout of the read data that is included in the read data. Specifically, it is sufficient if the controller causes the file name associated with the read data to be output based on the machine-learned model. The controller may associate the generated file name with the read data and cause the file name to be stored in the storage section. The controller may receive an operation of changing the file name from the user, associate the changed file name with the read data, and cause the file name to be stored in the storage section.

The relearning by the learning section is not limited to the relearning to be executed when a file name is changed. When a new file name is generated, teaching data in which the new file name and read data are associated with each other may be added to the original teaching data, and the relearning may be executed by the learning section. The relearning that is executed when a file name generated by the controller is changed may be executed in any of various manners. For example, in the foregoing embodiment, the effect of the file name after the change on the learning result is larger than the effect of the file name before the change on the learning result due to the data augmentation of the teaching data in which the file name after the change is associated with the read data. The processor 10, however, is not limited to this configuration. For example, the teaching data in which the file name before the change and the read data are associated with each other may be deleted.

Even in the case where the file name including the date information included in the read data is output, various aspects may be embodied. For example, a year, a month, and a date may be registered in the word data 20$f$ in advance, the machine learning may be executed by a model including a node for outputting a code indicating the presence of the year, the month, and the date, and a file name that includes the year, the month, and the date may be generated.

The file name indicated by the teaching data may be generated based on the character string read by OCR executed on the read data. Specifically, the file name may be configured based on the character string included in the document. A character string input by the user and the character string read by OCR may be included in the file name.

The controller may identify an issuance source of the document based on an image indicating the issuance source and generate a file name including the name of the issuance source. The identification of the issuance source of the document and the generation of the file name including the issuance source may be executed by different machine-learned models, respectively, or may be executed by a single machine-learned model. Various aspects of the identification of the issuance source of the document and the generation of the file name including the issuance source may be embodied. In the former case, a library of the machine-learned model that is used to identify the issuance source indicated by the image from the image may be used. The image indicating the issuance source may not be a logomark and may be any of various images. For example, the image indicating the issuance source may be an image indicating the name of the issuance source, such as a company name, an icon specific to the issuance source, a combination of colors, a graphic shape, or the like.

It can be considered that the CNN depicted in FIG. 3 identifies the issuance source of the document based on the image indicating the issuance source and generates the file name including the name of the issuance source. For example, when the read data includes the logo Il as indicated by the document D depicted in FIG. 6, the logo Il indicates a company that has issued the receipt. While the read data includes the logo Il, the CNN depicted in FIG. 3 may generate a file name. It can be said that, when the name, indicated by the logo Il, of the company that has issued the receipt and the name of the shop are included in the file name, the CNN identifies the issuance source of the document and generates the file name including the name of the issuance source.

It is sufficient if at least one of the image, the character string, and the layout is teaching data. However, two or more of the image, the character string, and the layout may be the teaching data. Other information or, for example, a color within the image, information indicating whether or not a handwritten character exists, a detail of the character, or the like may be the teaching data. Various aspects of the teaching data may be embodied. When the image, the character string, and the layout are considered, the teaching data 20c and the machine-learned model 20b may be changed in the configuration depicted in FIG. 1.

FIG. 7 is a diagram depicting a model for generating a file name based on an image, a character string, and a layout. Although the form of the file name output by the model depicted in FIG. 7 is the same as or similar to that of the model depicted in FIG. 3, the output form is not limited. When the read data is treated as an image, the form of data input to the model depicted in FIG. 7 is the same as or similar to that of the model depicted in FIG. 3 (the input is represented by image data). In this example, the character string is obtained by OCR and represented as OCR data. In this example, the layout is obtained by image processing and represented as layout data.

It is sufficient if the OCR data indicates the character string included in the read data. For example, the OCR data may be configured as data indicating codes of characters in the order in which the characters are arranged. In this case, the model may have a configuration in which the codes of the characters are input to nodes of an input layer $L_{i2}$, a configuration in which codes of words or codes of morphemes are input to the nodes of the input layer $L_{i2}$, or the like. In the case where the OCR data is input, characteristics of the character string may be associated with the file name. In this case, the characteristics of the character string indicate that the date information Id, the prices Ip, the subtotal Ist, the tax It, and the like are represented in order, like the document D depicted in FIG. 6. When the OCR data is input to the input layer $L_{i2}$, intermediate output data is output from a layer $L_{n2}$ via the neural network. In the example depicted in FIG. 7, although nodes of the layer $L_{n2}$ are connected to an output layer $L_o$ of the model, the intermediate output data may reach the output layer $L_o$ via an arbitrary number of layers.

It is sufficient if the layout data indicates the layout indicating the character string, the image, and the like that are included in the read data. For example, the model may have a configuration in which information indicating the type (character, picture, shape, and the like), position, and size of an object that exists is input to nodes of an input layer $L_{i3}$ for each of regions of the document. For example, in the case where the layout data is input, characteristics of the layout may be associated with the file name, like the document D depicted in FIG. 6. In this case, the characteristics of the layout indicate that the date information Id is indicated on the upper right side, the logo Il is indicated in the upper center, the message Im whose character string is smaller than the date information Id is indicated on the lower side of the logo Il, and the like.

When the layout data is input to the input layer $L_{i3}$, intermediate output data is output from a layer $L_{n3}$ via the neural network. In the example depicted in FIG. 7, nodes of the layer $L_{n3}$ are connected to the output layer $L_o$, but the intermediate output data may reach the output layer $L_o$ via an arbitrary number of layers. In addition, either the OCR data or the layout data may be input to the model. Other information on the read data may be input to the model.

In any of the cases, when the processor 10 executes the machine learning based on the model, the processor 10 can learn the machine-learned model 20b that outputs the file name based on the image, the character string, and the layout that are included in the read data. When the machine-learned model 20b is obtained, the processor 10 generates the OCR data and the layout data based on the read data and inputs the read data as image data, the OCR data, and the layout data to the machine-learned model 20b. As a result, the processor 10 can generate the file name of the read data.

The disclosure is applicable to a program and a method that are executed by a computer. Each of the program and the method may be enabled by a single device or may be enabled using components included in multiple devices. Various aspects of each of the program and the method are included in the disclosure. In addition, each of the program and the method may be enabled by both software and hardware or may be changed when necessary. The disclosure is also applicable to a storage medium storing the program. The storage medium storing the program may be a magnetic storage medium, a semiconductor memory, or any recording medium that will be developed in the future.

What is claimed is:

1. An information processing device comprising:
    a storage section that stores a machine-learned model subjected to machine learning using teaching data in which at least one of an image included in read data of a document read by a scanner, a character string included in the read data, and a layout of the read data that is included in the read data that is associated with a file name of the read data;
    a controller that generates the file name of the read data using at least one of the image, the character string, and the layout that are included in the read data; and
    a learning section that relearns, when the file name generated by the controller is changed, the machine-learned model using the teaching data in which at least one of the image included in the read data, the character string included in the read data, and the layout of the read data that is included in the read data that is associated with the file name after the change.

2. The information processing device according to claim 1, wherein
    the learning section relearns the machine-learned model so that an effect of the file name after the change on a learning result is larger than an effect of the file name before the change on the learning result.

3. The information processing device according to claim 2, wherein
    the learning section relearns the machine-learned model so that an effect of the character string changed on the learning result is larger than an effect of the character string before the change on the learning result.

4. The information processing device according to claim 1, wherein
    the file name includes date information included in the read data.

5. The information processing device according to claim 4, wherein
    the machine-learned model outputs information indicating whether the date information is included in the file name.

6. The information processing device according to claim 1, wherein
    the file name indicated by the teaching data includes at least one of a character string input by a user and a character string read by executing OCR on the read data.

7. The information processing device according to claim 1, wherein
    the image includes an image indicating an issuance source of the document, and the controller identifies the issuance source of the document based on the image indicating the issuance source and generates the file name including the name of the issuance source.

8. A machine learning device comprising:

a teaching data acquirer that acquires teaching data in which at least one of an image included in read data of a document read by a scanner, a character string included in the read data, and a layout of the read data that is included in the read data is associated with information on a file of the read data; and a learning section that executes, based on the teaching data, machine learning on a machine-learned model to which at least one of the image, the character string, and the layout that are included in the read data is input and that outputs the information on the file of the read data, wherein the learning model is also configured to relearn, when a file name generated by the machine-learned model is changed by a user, the machine-learned model, the teaching data further including at least one of an image included in read data, a character string included in the read data, and a layout of the read data that is included in the read data that is associated with the file name after the change.

9. An information processing method comprising:

using a machine-learned model subjected to machine learning using teaching data in which at least one of an image included in read data of a document read by a scanner, a character string included in the read data, and a layout of the read data that is included in the read data that is associated with information on a file of the read data to generate the information on the file of the read data based on at least one of the image, the character string, and the layout that are included in the read data; and using a learning section to relearn, when a file name generated by the machine-learned model is changed by a user, the machine-learned model using the teaching data in which at least one of the image included in the read data, the character string included in the read data, and the layout of the read data that is included in the read data that is associated with the file name after the change.

* * * * *